US012572788B2

(12) United States Patent
Lee et al.

(10) Patent No.: US 12,572,788 B2
(45) Date of Patent: Mar. 10, 2026

(54) WEIGHT CONFIRMATION METHOD FOR AN ANALOG SYNAPTIC DEVICE OF AN ARTIFICIAL NEURAL NETWORK

(71) Applicants:HYUNDAI MOTOR COMPANY, Seoul (KR); KIA CORPORATION, Seoul (KR); POSTECH ACADEMY-INDUSTRY FOUNDATION, Pohang-si (KR)

(72) Inventors: Ji-Sung Lee, Suwon-si (KR); Su-Jung Noh, Seoul (KR); Han-Saem Lee, Seoul (KR); Joon-Hyun Kwon, Hwaseong-si (KR); Hyun-Sang Hwang, Daegu (KR); Woo-Seok Choi, Hanam-si (KR)

(73) Assignees: HYUNDAI MOTOR COMPANY, Seoul (KR); KIA CORPORATION, Seoul (KR); POSTECH ACADEMY-INDUSTRY FOUNDATION, Pohang-si (KR)

( * ) Notice: Subject to any disclaimer, the term of this patent is extended or adjusted under 35 U.S.C. 154(b) by 891 days.

(21) Appl. No.: 17/718,612

(22) Filed: Apr. 12, 2022

(65) Prior Publication Data

US 2023/0186068 A1 Jun. 15, 2023

(30) Foreign Application Priority Data

Dec. 10, 2021 (KR) ........................ 10-2021-0176414

(51) Int. Cl.
*G06N 3/065* (2023.01)
(52) U.S. Cl.
CPC ..................................... *G06N 3/065* (2023.01)
(58) Field of Classification Search
CPC .......... G06N 3/065; G06N 3/063; G06N 3/08; G06N 3/04
See application file for complete search history.

(56) References Cited

U.S. PATENT DOCUMENTS 4,874,963 A * 10/1989 Alspector .............. G06N 3/065
377/2
10,861,551 B2 12/2020 Minucci et al.
(Continued)

FOREIGN PATENT DOCUMENTS

JP 6956191 B2 10/2021
KR 20210087389 A 7/2021
(Continued)

OTHER PUBLICATIONS

A. Laborieux et al., Low Power In-Memory Implementation of Ternary Neural Networks with Resistive RAM-Based Synapse, 2020 2nd IEEE International Conference on Artificial Intelligence Circuits and Systems (AICAS). 5 pp.
(Continued)

*Primary Examiner* — Kamran Afshar
*Assistant Examiner* — Brian J Hales
(74) *Attorney, Agent, or Firm* — Lempia Summerfield Katz LLC

(57) ABSTRACT

A weight confirmation method for analog synaptic devices of an artificial neural network includes: learning artificial neural network hardware based on artificial analog memory devices using an artificial neural network learning algorithm; after the learning of the artificial neural network hardware, reading a total weight of a pair of synaptic devices; comparing the total weight of the pair of synaptic devices with 0; applying weights to a positive synaptic device and a negative synaptic device of the pair of synaptic devices, respectively; and confirming the total weight of the pair of synaptic devices in accordance with the weight of the positive synaptic device and the weight of the negative synaptic device. A retention problem of analog synaptic devices is overcome and thus the artificial neural network may stably operate.

11 Claims, 14 Drawing Sheets

(56)         References Cited

U.S. PATENT DOCUMENTS

| | | | |
|---|---|---|---|
| 11,615,299 B2 | 3/2023 | Mochida et al. | |
| 2019/0080755 A1* | 3/2019 | Seo ........................ | G06N 3/065 |
| 2021/0151674 A1 | 5/2021 | Pesic et al. | |
| 2021/0192325 A1* | 6/2021 | Hoang ................... | G06N 3/063 |
| 2021/0209454 A1 | 7/2021 | Lee et al. | |

FOREIGN PATENT DOCUMENTS

| | | |
|---|---|---|
| KR | 20210090722 A | 7/2021 |
| WO | 2019049842 A1 | 3/2019 |

OTHER PUBLICATIONS

Office Action cited in Korean application No. 10-2021-0176414; Jun. 24, 2025; 19 pp.

Yi-Fan Qin et al., Design of High Robustness BNN Inference Accelerator Based on Binary Memristors, IEEE Transactions on Electron Devices, vol. 67, No. 8, Aug. 2020, 7pp.

* cited by examiner

FIG. 15

| Binarization | $W^+$ | $W^-$ |
|---|---|---|
| If $W_{total} > 0$ | Confirmation ($W^+ \leftarrow 1$) | Reset ($W^- \leftarrow 0$) |
| If $W_{total} < 0$ | Reset ($W^+ \leftarrow 0$) | Confirmation ($W^- \leftarrow 1$) |

FIG. 16

| Ternarization | $W^+$ | $W^-$ |
|---|---|---|
| If $W_{total} > W_{th}$ | Confirmation ($W^+ \leftarrow 1$) | Reset ($W^- \leftarrow 0$) |
| If $-W_{th} < W_{total} < W_{th}$ | Reset ($W^+ \leftarrow 0$) | Reset ($W^- \leftarrow 0$) |
| If $W_{total} < -W_{th}$ | Reset ($W^+ \leftarrow 0$) | Confirmation ($W^- \leftarrow 1$) |

FIG. 17
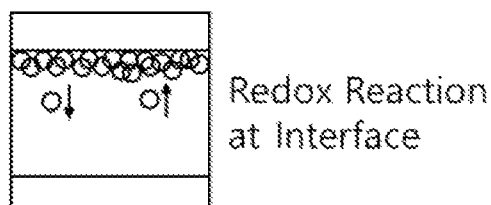
Redox Reaction at Interface
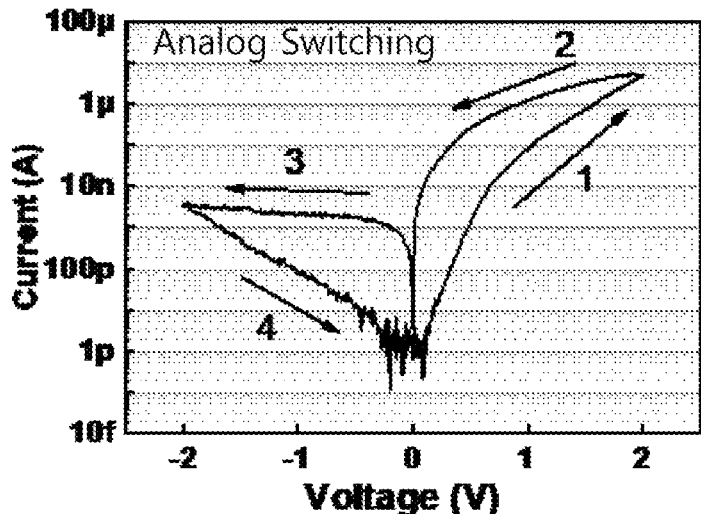

FIG. 18
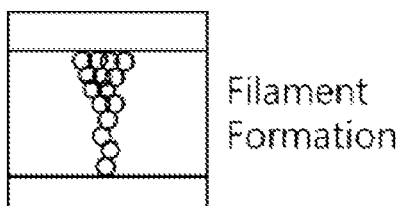
Filament
Formation
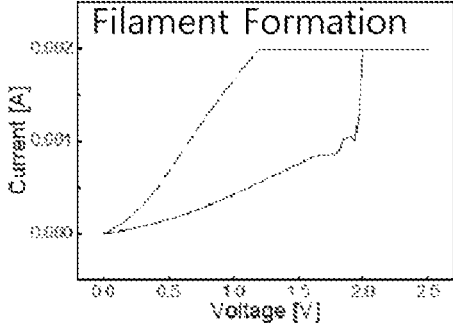

WEIGHT CONFIRMATION METHOD FOR AN ANALOG SYNAPTIC DEVICE OF AN ARTIFICIAL NEURAL NETWORK

CROSS-REFERENCE TO RELATED APPLICATION

This application claims priority to Korean Patent Application No. 10-2021-0176414, filed on Dec. 10, 2021, the content of which is incorporated herein by reference in its entirety.

BACKGROUND

Field

The present disclosure relates to a weight confirmation method for analog synaptic devices of an artificial neural network.

Description of Related Art

In general, a neuromorphic system is a system configured to emulate the human brain and configured to process data and learn in a manner similar to the brain. Specifically, one neuron device is connected to another neuron device through a synaptic device. When a neuron device outputs data, a synaptic device delivers the input analog data.

For high resolution weights, synaptic devices, i.e., analog synaptic devices, the conductance of which gradually changes, are used. However, most analog synaptic devices suffer from a retention problem that the conductance decreases over time. Thus, it is difficult for an artificial neural network to stably operate.

Binary neural network (BNN)/ternary neural network (TNN) having lower device burden uses finally binarized/ternarized weights. However, high resolution weights are still required during learning. For this, in the related art, an off-chip learning method of performing, by an external processor, learning with high resolution weights and moving binarized/ternarized weights, obtained through the learning, to a 1-bit resistive random access memory (RRAM) array is used.

In this regard, a method of operating a plurality of 1-bit RRAMs having an insignificant retention problem as a single synapse is also proposed. However, this method is not area-efficient, since a large number of devices are used for high resolution.

In addition, related-art BNN/TNN hardware based on an XNOR operation or a single memory device operates on the basis of a comparator. Thus, synapse array inference cannot be completely parallel.

The above information disclosed in this Background section is only for enhancement of understanding of the background of the disclosure and accordingly it may include information that does not form the prior art that is already known to a person of ordinary skill in the art.

SUMMARY

The present disclosure provides a weight confirmation method for analog synaptic devices of an artificial neural network. The method is able to overcome a retention problem of analog synaptic devices and thus enable the artificial neural network to stably operate.

According to an aspect of the present disclosure, a weight confirmation method for analog synaptic devices of an artificial neural network may include learning artificial neural network hardware based on artificial analog memory devices using an artificial neural network learning algorithm. The weight confirmation method also includes after the learning of the artificial neural network hardware, reading a total weight of a pair of synaptic devices. The weight confirmation method may also include comparing the total weight of the pair of synaptic devices with 0. The weight confirmation method may also include applying weights to a positive synaptic device and a negative synaptic device of the pair of synaptic devices, respectively. The weight confirmation method may also include confirming the total weight of the pair of synaptic devices in accordance with the weight of the positive synaptic device and the weight of the negative synaptic device.

In addition, when the total weight of the pair of synaptic devices is greater than 0 in the comparison, the application of the weights may include: applying a weight 1 by applying a stress voltage of a predetermined or higher level to the positive synaptic device; and applying a weight 0 by resetting the negative synaptic device.

The confirmation of the total weight may confirm the total weight as 1.

When the total weight of the pair of synaptic devices is not greater than 0 in the comparison, the application of the weights may include: applying a weight 0 by resetting the positive synaptic device; and applying a weight 1 by applying a stress voltage of a predetermined or higher level to the negative synaptic device.

In addition, the confirmation of the total weight may confirm the total weight as 0.

According to another aspect of the present disclosure, a weight confirmation method for analog synaptic devices of an artificial neural network may include learning an artificial neural network using a ternary artificial neural network learning algorithm. The weight confirmation method may also include after the learning of the artificial neural network, reading a total weight of a pair of synaptic devices. The weight confirmation method may also include comparing the total weight of the pair of synaptic devices with a predetermined weight. The weight confirmation method may also include applying weights to a positive synaptic device and a negative synaptic device of the pair of synaptic devices, respectively. The weight confirmation method may also include confirming the total weight of the pair of synaptic devices in accordance with the weight of the positive synaptic device and the weight of the negative synaptic device.

When the total weight of the pair of synaptic devices is greater than the predetermined weight in the comparison, the application of the weights may include: applying a weight 1 by applying a stress voltage of a predetermined or higher level to the positive synaptic device; and applying a weight 0 by resetting the negative synaptic device.

The confirmation of the total weight may confirm the total weight as 1.

The weight confirmation method may further include, when the total weight of the pair of synaptic devices is not greater than the predetermined weight in the comparison, comparing the total weight of the pair of synaptic devices with a negative value of the predetermined weight.

When the total weight of the pair of synaptic devices is smaller than negative value of the predetermined weight in the comparison of the total weight with the negative value of the predetermined weight, the application of the weights may include: applying a weight 0 by resetting the positive synaptic device; and applying a weight 1 by applying a stress voltage of a predetermined or higher level to the negative synaptic device.

The confirmation of the total weight may confirm the total weight as 1.

When the total weight of the pair of synaptic devices is not smaller than negative value of the predetermined weight in the comparison of the total weight with the negative value of the predetermined weight, the application of the weights may include: applying a weight 0 by resetting the positive synaptic device; and applying a weight 0 by resetting the negative synaptic device.

The confirmation of the total weight may confirm the total weight as 0.

According to the present disclosure, it is possible to perform on-chip learning of synaptic weights of a binary/ternary artificial neural network at high resolution using analog conductance conversion characteristics of a single memory device serving as a synaptic device.

In addition, it is possible to obtain stable inference performance of the artificial neural network using 1-bit synaptic devices having excellent retention characteristics by confirmation of the learned weights of the synaptic devices.

BRIEF DESCRIPTION OF THE DRAWINGS

In order that the disclosure may be well understood, there will now be described various forms thereof, given by way of example, reference being made to the accompanying drawings, in which:

FIG. 15 illustrates the binarization method of FIG. 13;

FIG. 16 illustrates the ternarization method of FIG. 14;

FIG. 17 illustrates analog operation characteristics of the analog synaptic device, and FIG. 18 illustrates operation characteristics in response to weight confirmation.

The drawings described herein are for illustration purposes only and are not intended to limit the scope of the present disclosure in any way.

DETAILED DESCRIPTION

The present disclosure, operational advantages of the present disclosure, and objects realized by implementation of the present disclosure should be fully understood from the following detailed description of embodiments of the present disclosure, taken in conjunction of the accompanying drawings.

In the description of embodiments of the present disclosure, either a detailed or a repetitive description of known functions have been omitted when the subject matter of the present disclosure may be rendered unclear thereby. When a component, device, element, or the like of the present disclosure is described as having a purpose or performing an operation, function, or the like, the component, device, or element should be considered herein as being "configured to" meet that purpose or to perform that operation or function.

The present disclosure relates to a weight confirmation method for analog synaptic devices of an artificial neural network, wherein each of the analog synaptic devices may include a non-volatile resistive random access memory (RRAM) device.

Figure 1:
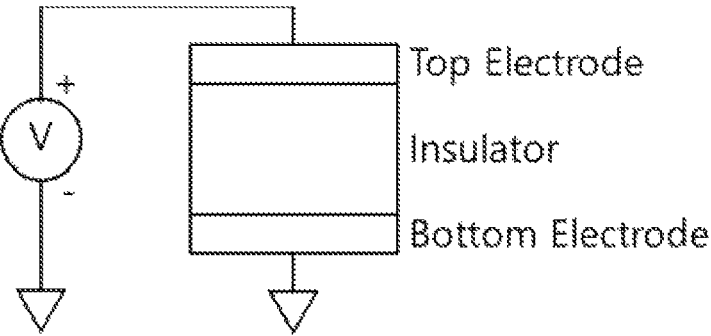
FIG. 1 illustrates a basic structure of an RRAM.
Figure 2:
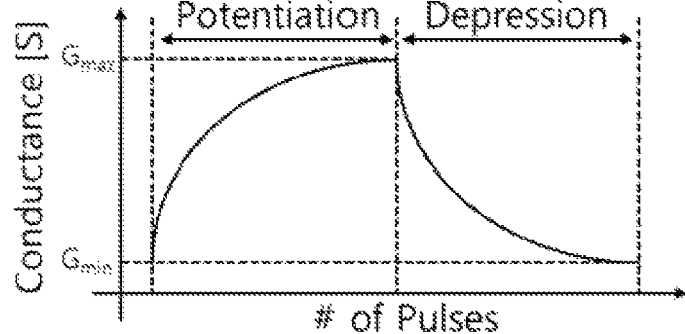
FIG. 2 illustrates conductance change characteristics.

As illustrated in FIG. 1, the RRAM device has a 2-terminal structure. When a voltage is applied to both electrodes, the conductance of the RRAM device varies as illustrated in FIG. 2. Thus, due to the variable conductance characteristics, the RRAM device may be used as a synaptic device.

Figure 3:
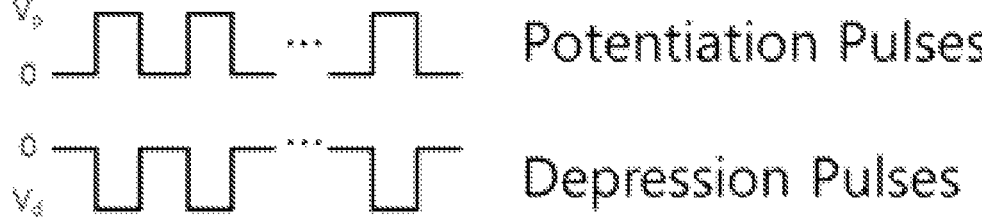
FIG. 3 illustrates voltage pulses applied.

Among RRAM devices, there is an RRAM device, the conductance of which gradually changes in response to voltage pulses applied thereto. Such an RRAM device is referred to as an analog synaptic device. As illustrated in FIG. 3, conductance gradually increases or decreases when potentiation pulses or depression pulses having a suitable magnitude $V_p$ or $V_d$ are applied.

Most analog synaptic devices have an operating mechanism in which the conductance thereof is changed by oxidation/reduction at the interface. The conductance may be precisely changed by adjusting the number of potentiation/depression pulses. These features require a learning process of an artificial neural network requiring high weight resolution.

Figure 4:
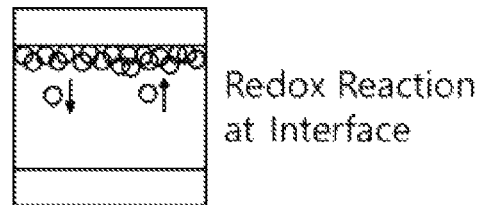
FIG. 4 illustrates an interface ion arrangement.

As illustrated in FIG. 4, a retention problem may occur. Specifically, diffusion occurs due to non-uniform concentration difference of ions at the interface, and the conductance value varies over time.

Figure 5:
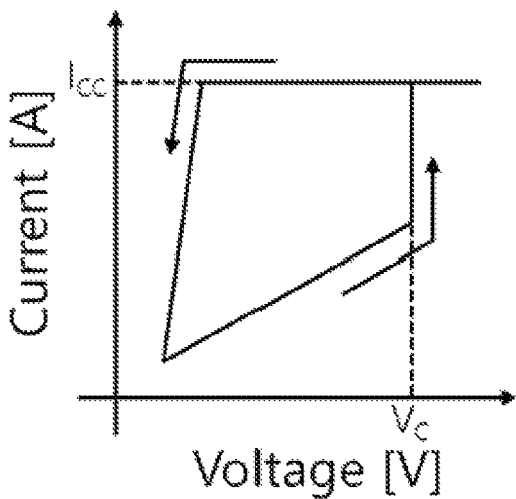
FIG. 5 and FIG. 6 illustrate characteristics when a large voltage is applied to an RRAM device.
Figure 6:
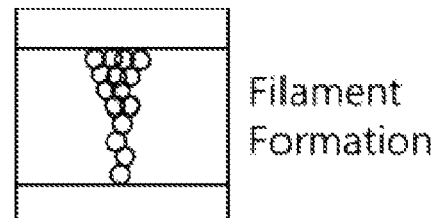

As illustrated in FIG. 5, when a sufficiently large voltage is applied, the RRAM device performs an operation of rapidly increasing the value of the conductance. As illustrated in FIG. 6, this typically has an operating mechanism in which a high-conductivity filament is provided between two electrodes.

Figure 7:
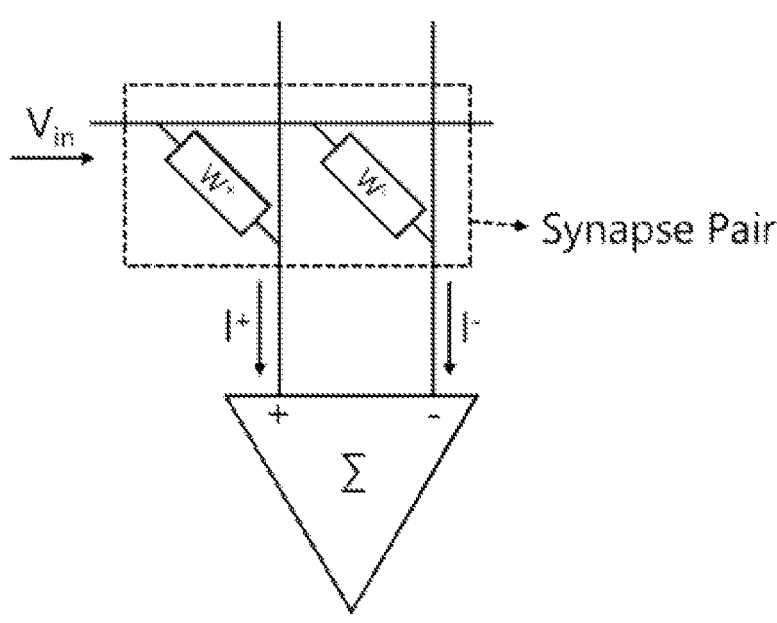
FIG. 7 illustrates a pair of synapses.
Figure 8:
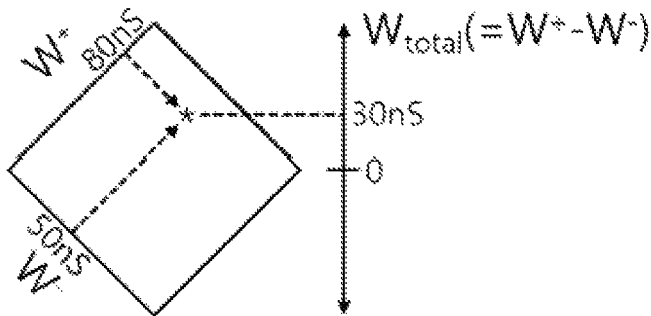
FIG. 8 illustrates weights of the pair of synapses.

The weight of the synaptic device physically corresponds to the conductance of the device. The weight calculated by the learning algorithm of the artificial neural network has both positive and negative weight values. However, since the conductance of the device is always a positive value, the difference in the conductance between two synaptic devices is used as a total synaptic weight so as to express a negative conductance, as illustrated in FIG. 7. As illustrated in FIG. 8, the total synaptic weight $W_{total}$ may be expressed as the difference $W_+ - W_-$ of the weight between a pair of synapses.

Figure 9:
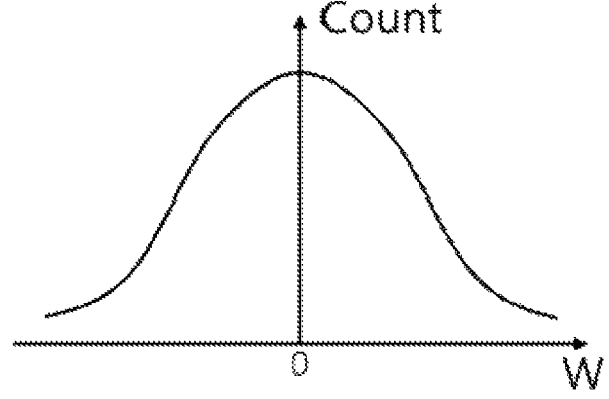
FIG. 9 illustrates a distribution of weights of an artificial neural network.
Figure 10:
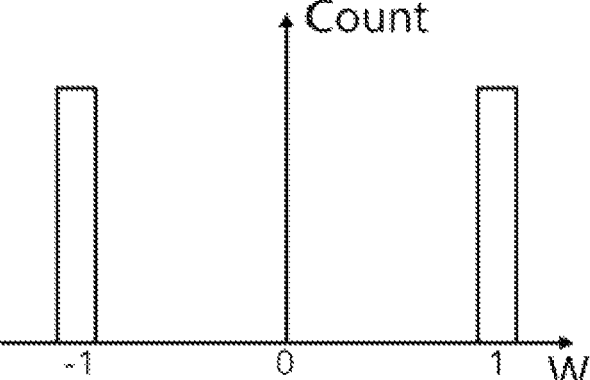
FIG. 10 illustrates the binarization of the weights.

FIG. 9 illustrates weights of the artificial neural network having a predetermined distribution. When the weights having the distribution illustrated in FIG. 9 are binarized, a distribution of 1 and −1 values is obtained, as illustrated in FIG. 10. The binarization converges the weights to 1 and −1 by taking 0 as a reference and determining whether each of the weights is greater or smaller than 0.

Figure 11:
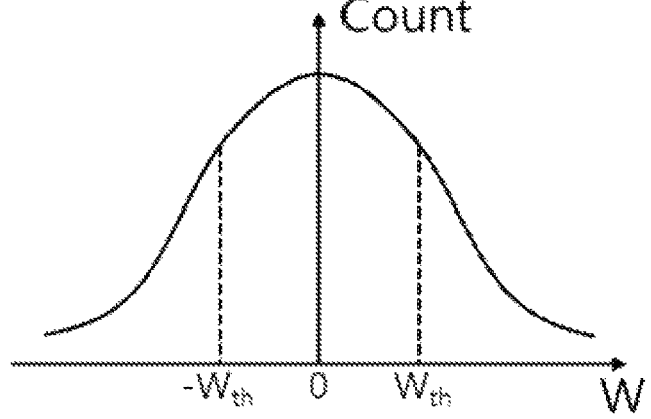
FIG. 11 illustrates a distribution of weights of an artificial neural network.
Figure 12:
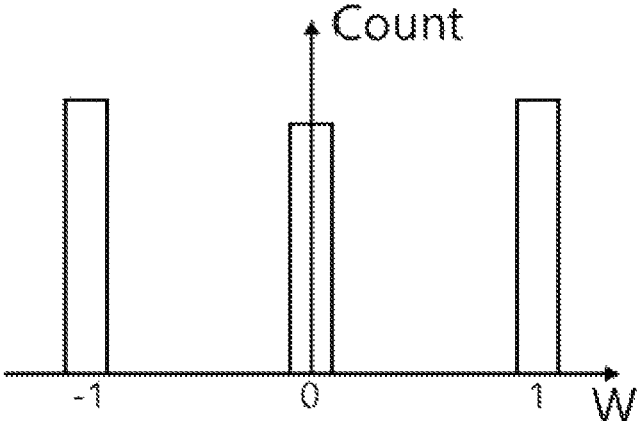
FIG. 12 illustrates the ternarization of the weights.

FIG. 11 illustrates weights of the artificial neural network having a predetermined distribution. When the weights having the distribution illustrated in FIG. 11 are ternarized, a distribution of 1, 0, and −1 values is obtained, as illustrated in FIG. 12. The ternarization converges the weights into 1, 0, and −1 by taking $W_{th}$ and −$W_{th}$ as references and determining whether each of the weights is smaller or greater than the reference $W_{th}$ or −$W_{th}$.

Figure 13:
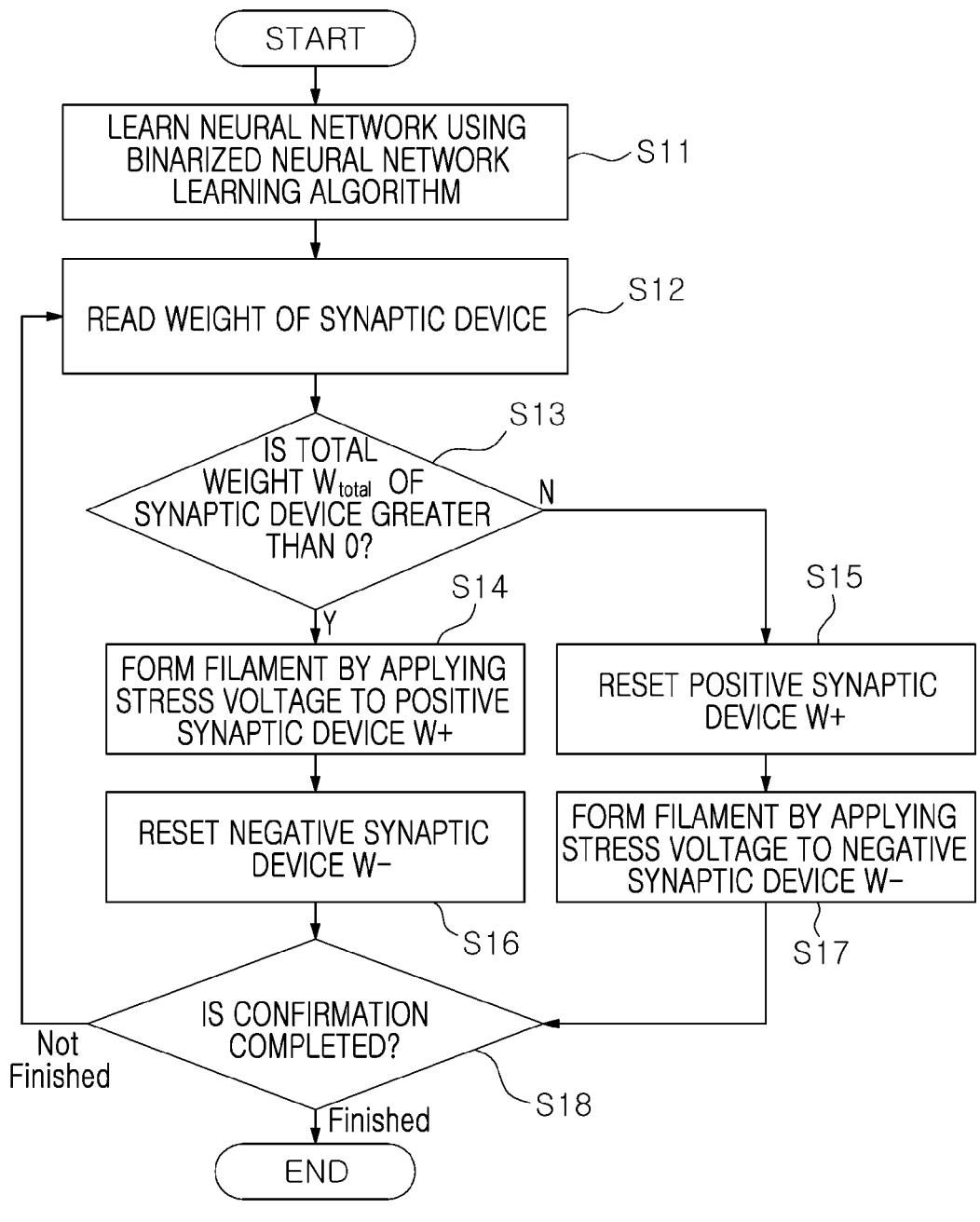
FIG. 13 illustrates a weight confirmation method for analog synaptic devices of a binary artificial neural network according to an embodiment of the present disclosure.

FIG. 13 illustrates a weight confirmation method for analog synaptic devices of a binary artificial neural network according to an embodiment of the present disclosure, and FIG. 15 specifically illustrates the binarization method of FIG. 13.

Hereinafter, the weight confirmation method for analog synaptic devices of an artificial neural network according to an embodiment of the present disclosure is described with reference to FIGS. 13 and 15.

On-chip BNN/TNN learning is performed using the advantage of analog synapses having high conductance resolution. Here, as described above, analog synapses have a retention problem that the conductance decreases over time.

The present disclosure forms strong filaments inside synaptic devices in order to prevent the weights of the synaptic devices confirmed by learning from being reduced by retention. Since a strong filament is not easily loosened after being formed, the conductance of the corresponding synaptic device can be stably maintained for an extended time. This may be referred to as weight confirmation of the synaptic device.

The binary artificial neural network uses finally binarized weights 1 and −1. Thus, after having read the weights of each of the synaptic devices, the binary artificial neural network determines whether or not the value of the total weight is greater than 0 and converges the total weight to 1 or −1. Specifically, the binary artificial neural network uses the weight confirmation method of forming a strong filament inside the analog synaptic device by applying a sufficiently large voltage to the analog synaptic device when converging the total weight to 1 or −1.

Described sequentially, the artificial neural network learns using a binarized artificial neural network learning algorithm in S11.

In addition, the weight of each of the synaptic devices is read in S12.

Afterwards, whether or not the read weight $w_{total}$ is greater than 0 is determined in S13.

When the value of the total weight after the learning is greater than 0 as the result of the determination (Y in S13), a stress voltage of a predetermined or higher level is applied to a positive synaptic device $W_+$ of a pair of synaptic devices, so that interface ions form a filament in S14. In this manner, a weight 1 is obtained. Here, the formation of the filament is an example, and not only the formation of the filament but also a permanent short may also be included.

Afterwards, the negative synaptic device $W_-$ is reset to have a weight 0 in S16. Consequently, the weight confirmation is completed in S18.

As described above, a pair of synaptic devices are used as a single synapse and the value of the total weight thereof is confirmed as the difference of the conductance between the two synaptic devices. As a result, the value of the total weight is 1.

In contrast, when the value of the total weight after the learning is not greater than 0 as the result of the determination S13 (N in S13), the positive synaptic device $W_+$ is reset to have a weight 0 in S15. In addition, a stress voltage is applied to the negative synaptic device $W_-$ to form a filament in S17 to have a weight 1. Consequently, the weight confirmation is completed in S18.

Here, the difference of the conductance between the two devices is −1.

Figure 14:
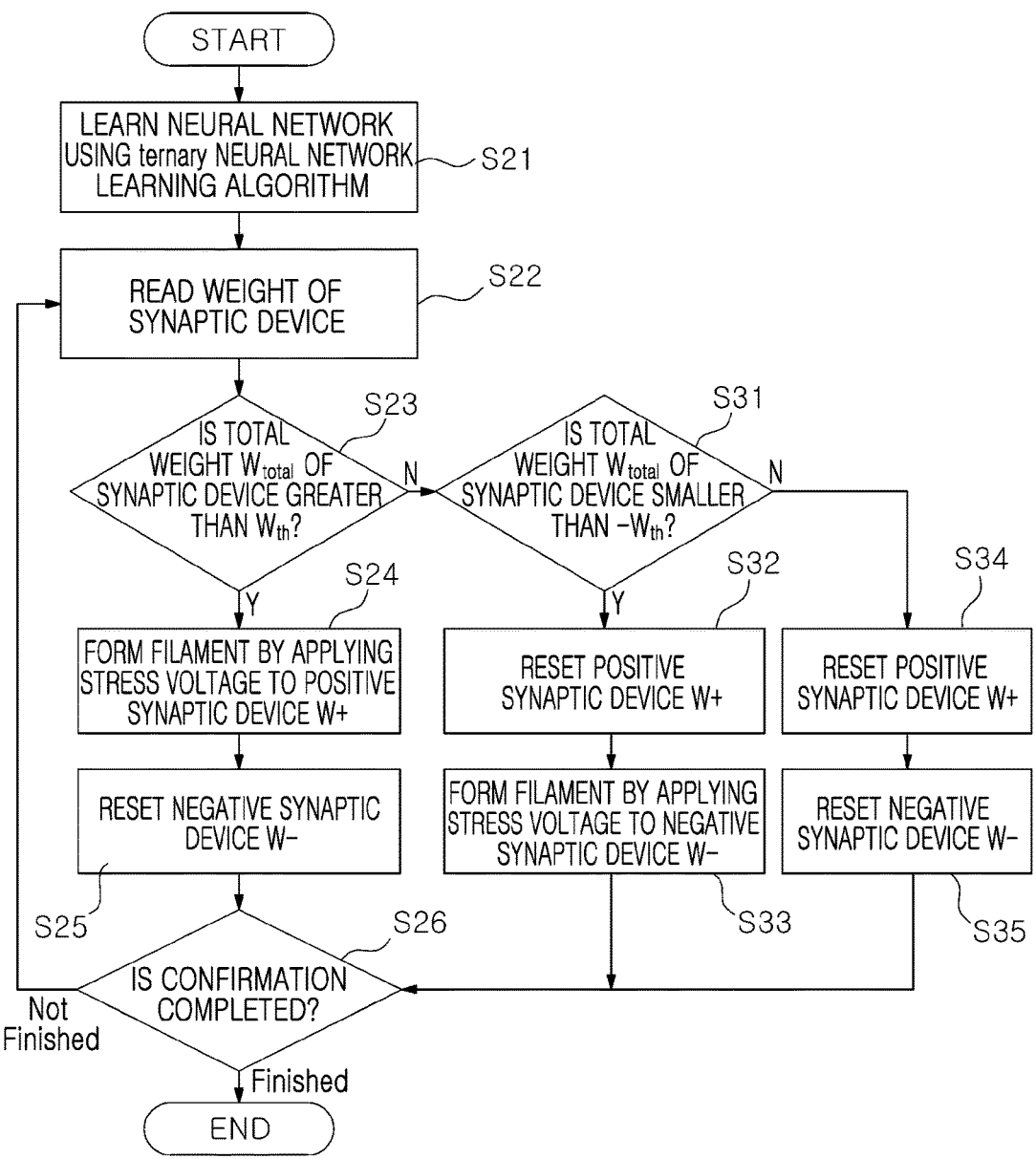
FIG. 14 illustrates a weight confirmation method for analog synaptic devices of a ternary artificial neural network according to another embodiment of the present disclosure.

Next, FIG. 14 illustrates a weight confirmation method for analog synaptic devices of a ternary artificial neural network according to another embodiment of the present disclosure, and FIG. 16 specifically illustrates the ternarization method of FIG. 14.

Hereinafter, the weight confirmation method for analog synaptic devices of an artificial neural network according to another embodiment of the present disclosure is described with reference to FIGS. 14 and 16.

The ternary artificial neural network uses finally ternarized weights 1, 0, and −1. Thus, after the weights of the synaptic devices are read, and the value of the total weight is converged to 1, 0, or −1 by determining whether the value of the total weight is greater or smaller than $W_{th}$ or −$W_{th}$. In the weight confirmation method used, strong filaments are formed inside the analog synaptic devices by applying a sufficiently large voltage to the analog synaptic devices when converging the weight to 1, 0, or −1.

The artificial neural network is learned using a ternary artificial neural network learning algorithm in S21.

Afterwards, weights of synaptic devices are read in S22.

Subsequently, whether or not the read weight $W_{total}$ is greater than the predetermined $W_{th}$ is determined in S23.

When the value of the total weight after the learning is greater than $W_{th}$ as the result of the determination (Y in S23), a stress voltage of a predetermined or higher level is applied to the positive synaptic device $W_+$ of the pair of synaptic devices so that interface ions form a filament in S24. Consequently, a weight 1 is obtained.

Afterwards, the negative synaptic device $W_-$ of the pair of synaptic devices is reset to have a weight 0 in S25. Consequently, the weight confirmation is completed in S26.

In this manner, one pair of synaptic devices are used as a single synapse, and the value of the total weight is determined by the difference of the conductance between the two synaptic devices. As a result, the value of the total weight is 1.

In contrast, when the value of the total weight is not greater than $W_{th}$ as the result of the determination S23 (N in S23), whether or not the read weight $W_{total}$ is smaller than −$W_{th}$ is determined in S31.

When the value of the total weight is smaller than −$W_i$h as the result of the determination (Y in S31), the positive synaptic device $W_+$ is reset to have a weight 0 in S32. A stress voltage is applied to the negative synaptic device $W_-$ to form a filament in S33 to have a weight 1. Consequently, the weight confirmation is completed in S26.

Here, the difference of the conductance between the two devices is −1.

In addition, when the value of the total weight is not smaller than −$W_{th}$ as the result of the determination S31 (N in S31), the positive synaptic device $W_+$ is reset to have a weight 0 in S34, and the negative synaptic device $W_-$ is reset to have a weight 0 in S35. Consequently, the weight confirmation is completed in S26.

Since high resolution weights are also required for the learning of the binary/ternary artificial neural network, the learning of the binary/ternary artificial neural network is performed using analog synapses. Here, an example of analog operation characteristics is illustrated in FIG. 17.

As described above, the present disclosure overcomes the retention problem of analog synapses by the weight confirmation after the learning is finished.

As illustrated in FIG. 18, the conductance may be stably maintained by forming strong filaments by applying a voltage of a sufficient level for weight confirmation. Consequently, the artificial neural network can operate stably.

Here, in the operation of the artificial neural network, the read voltage level is reduced, since the operating current is increased after the formation of the filaments.

Figure 19:
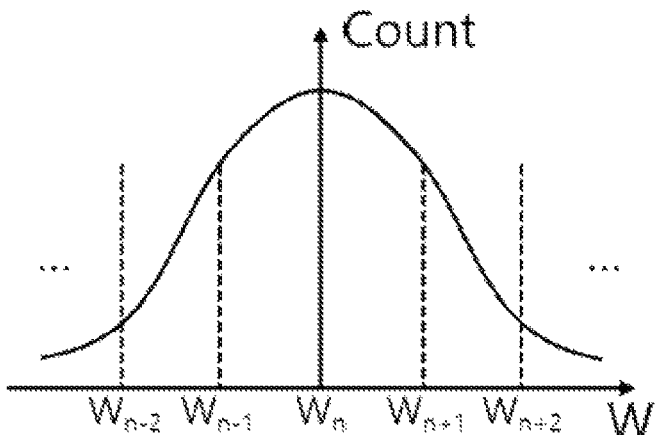
FIG. 19 illustrates a distribution of weights of the artificial neural network.
Figure 20:
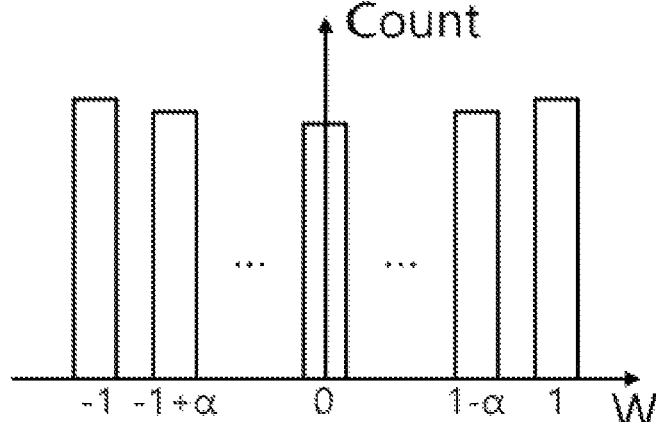
FIG. 20 illustrates quantized weights.

In addition, referring to FIGS. 19 and 20, the weight confirmation may also be used in learning of a quantized artificial neural network (QNN) comprising three or more variables.

Figure 21:
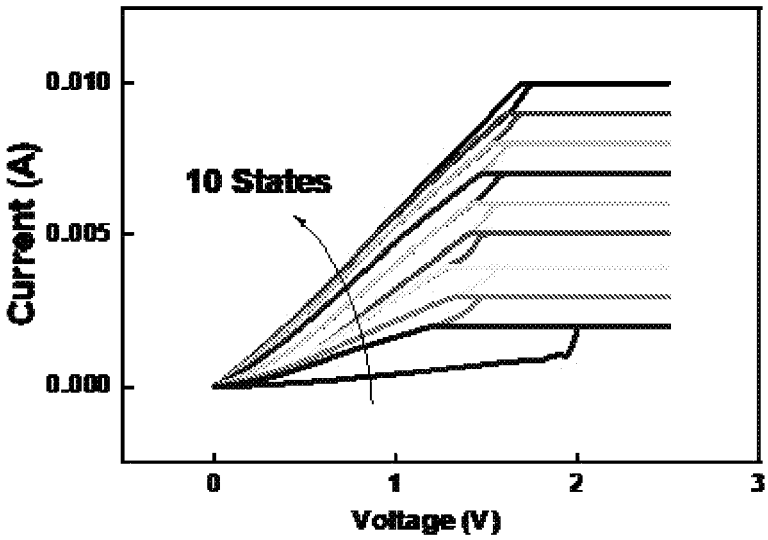
FIG. 21 illustrates confirmation of quantized weights due to formation of filaments having a multi-level characteristic.

Here, the number of synaptic devices necessary to express a single weight used is expected to increase as the resolution of quantization is higher. It is expected that confirmation capable of storing quantized weights comprising three or more variables can be performed by forming filaments having multi-level characteristics as illustrated in FIG. 21.

According to the present disclosure as described above, it is possible to perform on-chip learning of synaptic weights of a binary/ternary artificial neural network at high resolution using analog conductance conversion characteristics of a synaptic device. In addition, it is possible to obtain stable inference performance of the artificial neural network using 1-bit synaptic devices having excellent retention characteristics by confirmation of the learned weights of the synaptic devices.

Although the present disclosure has been described with reference to the accompanying drawings as set forth above, the present disclosure is not limited thereto. Those having ordinary skill in the art should appreciate that a variety of changes and modifications are possible without departing from the principle and scope of the present disclosure. Therefore, it should be understood that such changes or modifications belong to the appended claims of the present disclosure and the scope of the present disclosure shall be defined by the appended claims.

What is claimed is:

1. A weight confirmation method for analog synaptic devices of an artificial neural network, the weight confirmation method comprising:
   learning artificial neural network hardware based on artificial analog memory devices using an artificial neural network learning algorithm;
   after the learning of the artificial neural network hardware, reading a total weight of a pair of synaptic devices;
   comparing the total weight of the pair of synaptic devices with zero (0);
   applying weights to a positive synaptic device and a negative synaptic device of the pair of synaptic devices, respectively; and
   confirming the total weight of the pair of synaptic devices based on the weight of the positive synaptic device and the weight of the negative synaptic device,
   wherein applying the weights comprises applying a stress voltage of a predetermined or higher level to the positive synaptic device or the negative synaptic device, and
   wherein the weight confirmation method further comprises forming a filament inside a synaptic device to which the stress voltage is applied.

2. The weight confirmation method of claim 1, wherein, when the total weight of the pair of synaptic devices is greater than 0 in the comparison, applying the weights comprises:
   applying a weight 1 by applying the stress voltage of the predetermined or higher level to the positive synaptic device; and
   applying a weight 0 by resetting the negative synaptic device.

3. The weight confirmation method of claim 2, wherein confirming the total weight comprises confirming the total weight as 1.

4. The weight confirmation method of claim 1, wherein, when the total weight of the pair of synaptic devices is not greater than 0 in the comparison, applying the weights comprises:
   applying a weight 0 by resetting the positive synaptic device; and
   applying a weight 1 by applying the stress voltage of the predetermined or higher level to the negative synaptic device.

5. The weight confirmation method of claim 4, wherein confirming the total weight comprises confirming the total weight as 0.

6. A weight confirmation method for analog synaptic devices of an artificial neural network, the weight confirmation method comprising:
   learning an artificial neural network using a ternary artificial neural network learning algorithm;
   after the learning of the artificial neural network, reading a total weight of a pair of synaptic devices;
   comparing the total weight of the pair of synaptic devices with a predetermined weight;
   applying weights to a positive synaptic device and a negative synaptic device of the pair of synaptic devices, respectively; and
   confirming the total weight of the pair of synaptic devices in accordance with the weight of the positive synaptic device and the weight of the negative synaptic device,
   wherein applying the weights comprises applying a stress voltage of a predetermined or higher level to the positive synaptic device or the negative synaptic device, and
   wherein the weight confirmation method further comprises a filament inside a synaptic device to which the stress voltage is applied.

7. The weight confirmation method of claim 6, wherein, when the total weight of the pair of synaptic devices is greater than the predetermined weight in the comparison, applying the weights comprises:
   applying a weight 1 by applying the stress voltage of a predetermined or higher level to the positive synaptic device; and
   applying a weight 0 by resetting the negative synaptic device.

8. The weight confirmation method of claim 7, wherein confirming the total weight comprises confirming the total weight as 1.

9. The weight confirmation method of claim 6, further comprising, when the total weight of the pair of synaptic devices is not greater than the predetermined weight in the comparison, comparing the total weight of the pair of synaptic devices with a negative value of the predetermined weight.

10. The weight confirmation method of claim 9, wherein, when the total weight of the pair of synaptic devices is smaller than the negative value of the predetermined weight in the comparison of the total weight with the negative value of the predetermined weight, applying the weights comprises:

applying a weight 0 by resetting the positive synaptic device; and applying a weight 1 by applying the stress voltage of a predetermined or higher level to the negative synaptic device.

11. The weight confirmation method of claim 10, wherein confirming the total weight comprises confirming the total weight as 1.

* * * * *